US012792404B2

(12) United States Patent
Goodman et al.

(10) Patent No.: US 12,792,404 B2
(45) Date of Patent: Nov. 10, 2026

(54) FULL LIFECYCLE SUPPORT FOR ONBOARDING

(71) Applicant: Dell Products L.P., Round Rock, TX (US)

(72) Inventors: Bradley K. Goodman, Nashua, NH (US); Joseph Caisse, Burlington, MA (US); Govind Pulikode Mukundan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 616 days.

(21) Appl. No.: 18/240,556

(22) Filed: Aug. 31, 2023

(65) Prior Publication Data

US 2025/0077284 A1 Mar. 6, 2025

(51) Int. Cl.
*G06F 9/46* (2006.01)
*G06F 9/50* (2006.01)

(52) U.S. Cl.
CPC .................................. *G06F 9/5027* (2013.01)

(58) Field of Classification Search
CPC .................................................... G06F 9/5027
See application file for complete search history.

(56) References Cited

U.S. PATENT DOCUMENTS

2020/0275273 A1* 8/2020 Smith ................. H04L 63/1458
2020/0327231 A1* 10/2020 Smith ...................... G06F 21/33
2024/0086205 A1* 3/2024 Haddad ................. G06F 21/575
2024/0205021 A1* 6/2024 Eilam ................. G06F 21/6245

* cited by examiner

*Primary Examiner* — Tammy E Lee
(74) *Attorney, Agent, or Firm* — WOMBLE BOND DICKINSON (US) LLP

(57) ABSTRACT

Methods and systems for managing onboarding of data processing systems are disclosed. To onboard the data processing systems, partial onboardings may be performed. During the partial onboardings, authority resolution data may be supplemented to facilitate cooperation with orchestrators. Once onboarded, the authority resolution data may be used to re-onboard the data processing systems to other orchestrators. During re-onboarding, the authority resolution data may be used to establish delegations of authority to the other orchestrators to facilitate cooperation with the other orchestrators.

20 Claims, 7 Drawing Sheets

FULL LIFECYCLE SUPPORT FOR ONBOARDING

FIELD

Embodiments disclosed herein relate generally to managing device onboarding. More particularly, embodiments disclosed herein relate to systems and methods to perform partial onboardings of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
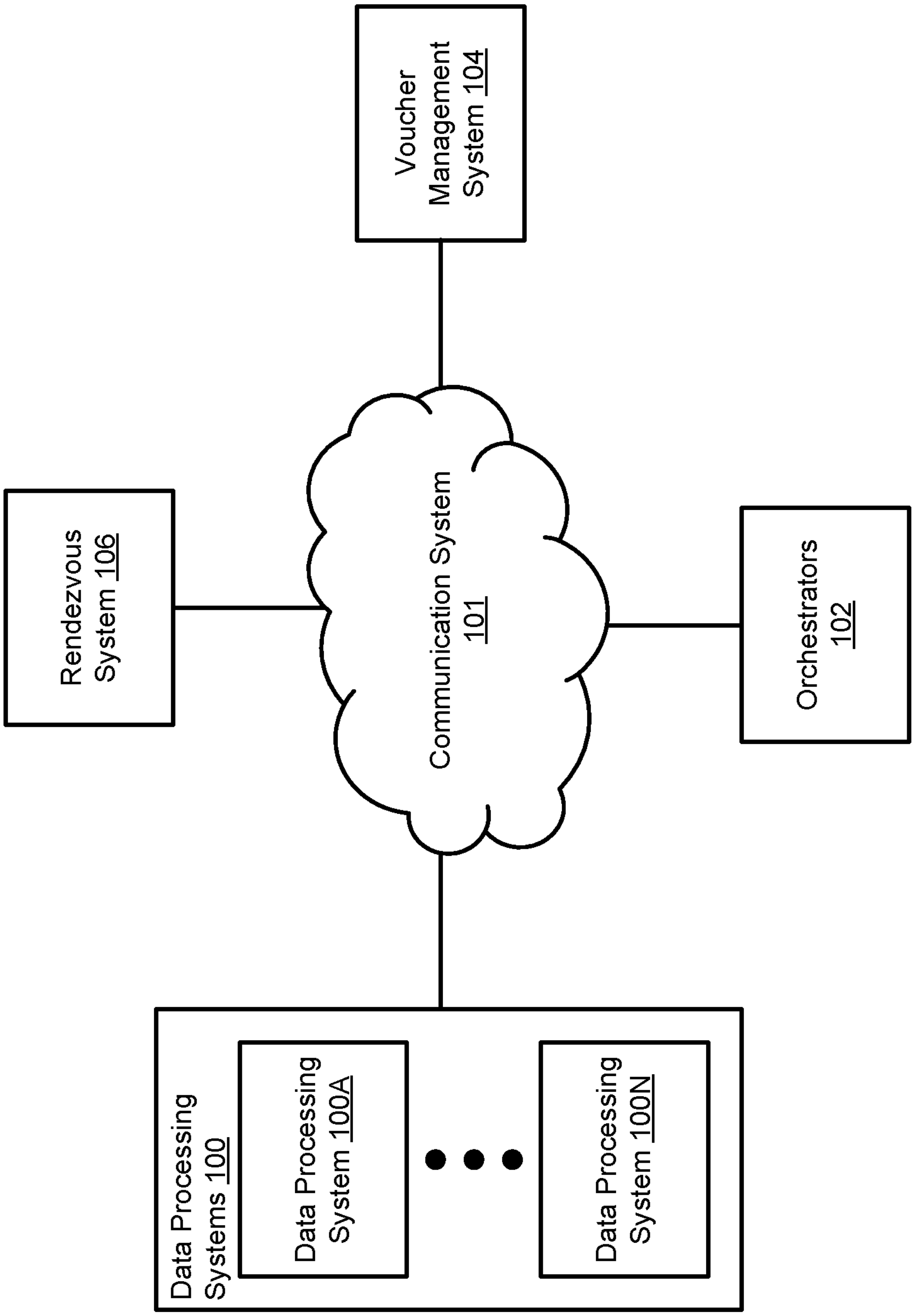
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing performance of computer-implemented services. The computer-implemented services may be performed by any number of data processing systems throughout a distributed environment. Performance of the computer-implemented services may be managed and/or facilitated by an entity in a distributed environment, such as an orchestrator, a user device and/or any other data processing system (e.g., device).

Data processing systems added to the distributed environment may be onboarded prior to participating in the computer-implemented services. Different types of onboardings may be performed.

During full onboarding, existing authority resolution data used by the data processing systems to validate authority of other entities may be at least partially replaced. Consequently, some of the authority resolution data may no longer be available after full onboarding.

During partial onboarding, the existing authority data may be supplement with additional data (e.g., rather than portions being replaced). Consequently, all of the existing authority resolution data may be available.

Overtime, data processing systems may need to be re-onboarded to different orchestrators (e.g., to redeploy resources for different purposes). If partial onboardings were previously performed, the authority resolution data may be used to perform onboardings without further supplementation. However, if full onboardings were previously performed, the authority resolution data may need further supplementation to re-onboard the data processing systems.

Thus, by performing partial onboardings, the resource cost for re-onboarding data processing systems may be reduced. For example, existing onboarding procedures and systems may be reused, and existing authority resolution data may be reused without supplementation.

In an embodiment, a method of managing onboarding of a data processing system is provided. The method may include obtaining replacement data for the data processing system from an orchestrator; making a first determination regarding whether the orchestrator is authorized to replace pre-onboarding ownership chain data with the replacement data; in a first instance of the first determination where the orchestrator is authorized: discarding the pre-onboarding ownership chain data in authority resolution data and add adding the replacement data to the authority resolution data to obtain first updated authority resolution data to complete onboarding of the data processing system; obtaining a first signed workorder; and processing the first signed workorder using the first updated authority resolution data; and in a second instance of the first determination where the orchestrator is not authorized: adding the replacement data to the authority resolution data to obtain second updated authority resolution data to complete the onboarding of the data processing system; obtaining a second signed workorder; and processing the second signed workorder using the second updated authority resolution data.

The method may also include, in the first instance of the first determination where the orchestrator is authorized: obtaining a request to onboard to a new orchestrator: making a second determination that the first updated authority resolution data does not comprise the pre-onboarding ownership chain data; based on the second determination: obtaining a new certificate chain that establishes delegation of authority between an existing owner as specified by the replacement data and a new owner that owns the new orchestrator; and using the new certificate chain to onboard to the new orchestrator.

The method may also include in the second instance of the first determination where the orchestrator not authorized: obtaining a request to onboard to a new orchestrator: making a second determination that the first updated authority resolution data comprises the pre-onboarding ownership chain data; based on the second determination: using the pre-onboarding ownership chain data to perform a second onboard of the data processing system to the new orchestrator.

Using the pre-onboarding ownership chain data to onboard to the new orchestrator may include contacting a rendezvous system to obtain a redirection to the new orchestrator; and verifying that the new orchestrator has authority over the data processing system using, at least in part, the pre-onboarding ownership chain data.

The method may further include, prior to obtaining the replacement data and during the onboarding: establishing, by the orchestrator and to the rendezvous system, authority over the data processing system using the pre-onboarding ownership chain data; redirecting, by the rendezvous system, the data processing system to the orchestrator; and verifying, by the data processing system, that the orchestrator has authority over the data processing system using, at least in part, the pre-onboarding ownership chain data.

The first determination may be made using an onboarding management certificate, the onboarding management certificate being verifiable using the pre-onboarding ownership chain data, and the onboarding management certificating indicate whether the orchestrator is authorized to replace pre-onboarding ownership chain data with the replacement data.

The orchestrator may be adapted to provide the replacement data or supplemental data to data processing systems during onboardings, the replacement data may include first instructions to replace any pre-onboarding ownership chain data trusted by the data processing systems with the replacement data, and the supplemental data may include second instructions to add the supplemental data to any pre-onboarding ownership chain data trusted by the data processing systems.

The replacement data may include a new root of trusted and a new globally unique identifier for the data processing system.

The pre-onboarding ownership chain data may include an original root of trust and an original globally unique identifier for the data processing system, and a certificate chain usable to verify that authority over the data processing system has been delegated from the root of trust to an owner of the orchestrator.

The replacement data may be signed with a key of the owner of the orchestrator.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and the method may be performed when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer-implemented services. For example, the computer-implemented services may include data storage services, instant messaging services, database services, and/or any other type of service that may be implemented with a computing device.

The type and quantity of computer implemented services may be limited by the resources available to provide the services. To expand the number and type of services provided, additional data processing systems may be onboard to a domain, a deployment, and/or other management domain tasked with providing the computer implemented services.

When initially constructed, data processing systems 100 may be given a root of trust (e.g., defined by a public key). Each data processing system may use their root of trust to validate whether to perform requested actions. As ownership over the data processing system changes over time, various delegations of authority may be documented using certificate chains. Consequently, the data processing systems may be able to validate requests all the way back to the initial root of trust.

To place a data processing system under the control of a management domain, the data processing system may be onboarded to the management domain.

For example, the data processing system may be onboarded prior to participating in computer-implemented services managed by the management domain. To onboard a data processing system of data processing systems 100 (e.g., data processing system 100A), an entity (e.g., a person/business that owns the data processing system) with authority over a data processing system of data processing systems 100 may obtain a voucher from voucher management system 104. The voucher may include cryptographically verifiable information that establishes a delegation of authority over the data processing system to an entity that has obtained the voucher.

To obtain the voucher, the entity with authority over data processing systems 100 (e.g., a user) may present access credentials to voucher management system 104. The access credentials may include any authentication factor (e.g., a password, a pin, a biometric factor, a cryptographic token, etc.) usable to verify the identity and permissions of the user and/or designated device such as orchestrator (e.g., 102) of a management domain.

Once obtained, the voucher may be used to direct a data processing system that has not been onboarded to orchestrator (e.g., one of orchestrators 102), which may manage the onboarding process. For example, a copy of and/or information from the voucher may be provided to rendezvous system 106 along with details regarding the designated orchestrator. A new data processing system that has not been onboarded (e.g., after purchase from a manufacturer or reseller), may by default attempt to communicate with rendezvous system 106. By providing the information to rendezvous system 106, rendezvous system 106 may automatically direct the data processing system to orchestrator 102.

Once directed to the orchestrator, the orchestrator may configure and/or otherwise manage the data processing system. As part of the management process, the orchestrator may provide replacement information for the root of trust, and/or other information (e.g., a globally unique identifier). The data processing system may replace the root of trust, and/or other information (e.g., collectively "original management information") with the replacement information to complete an onboarding (e.g., also referred to as a full-onboarding).

Thus, when future requests are received, the data processing system may use the replacement information to ascertain whether authority over the data processing system has been delegated to a requestor the made the future requests.

However, if the original management information is replaced, reverting a management state of the data processing system to a previous management state may be involved. Because the original management information has been replaced, vouchers that were previously usable to define the management state (e.g., which entity has authority over the data processing system) may no longer be usable. For example, a voucher may include cryptographically verifiable certificates that establish a chain of delegation of authority between an original root of trust and another entity. If the original root of trust is replaced, the voucher may not be usable to establish a chain of delegation of authority.

In general, embodiments disclosed herein may provide methods, systems, and devices for partial onboarding of data processing systems. During a partial onboarding, a data processing system may retain original management information during the onboarding process. When replacement information is obtained during the partial onboarding, the replacement information may be used instead as supplemental onboarding information. Consequently, the supplemental onboarding information may be added to the original management information, rather than replacing it.

By performing a partial onboarding, rather than a full onboarding, the management state of the data processing system may be efficiently reverted to previous management states. For example, the supplemental information may merely be discarded and the original management information may be retained to revert to a previous management state. Consequently, the original management information may be used in subsequent onboarding processes (and/or other types of processes that require verification of authority).

Additionally, during onboarding, full or partial onboardings may be selectively performed in accordance with a management model that may delegate authority for the type onboarding to perform to orchestrators of management domains. Authority over the type of onboarding to be performed may be delegated to the orchestrator using a certificate or other type of cryptographically verifiable data structure.

By doing so, embodiments disclosed herein may facilitate repeated onboarding without requiring as many new data structures to be generated. For example, existing certificate chains, roots of trust, and other data structures may be utilized. Consequently, data processing systems may be onboarded without needing to establish new chains of delegation of authority.

To provide the above noted functionality, the system may include data processing systems 100, orchestrators 102, voucher management system 104, and rendezvous system 106. Each of these components is discussed below.

To provide the computer-implemented services, the system may include any number of data processing systems 100. For example, data processing systems 100 may include one data processing system (e.g., data processing system 100A) or multiple data processing systems (e.g., 100A-100N). Each data processing system of data processing systems 100 may include hardware and/or software components usable to provide computer-implemented services. Data processing systems 100 may provide various computer-implemented services independently and/or cooperatively.

All, or a portion, of data processing systems 100 may provide (and/or participate in and/or support the) computer-implemented services to various computing devices operably connected to data processing systems 100. Different data processing systems may provide similar and/or different computer-implemented services. For example, data processing system 100N may be a new data processing system requiring onboarding to the distributed environment (via, for example, an interaction with rendezvous system 106, orchestrator 102, etc.).

Data processing systems 100 may be manufactured and/or owned by a first party, and provided (e.g., sold) to other parties for use in computer-implemented services. When initially manufactured, a root of trust may be established. When provided to the other party, a voucher may be used to transfer control over a data processing system to the other party. The voucher may include verifiable chains of delegation between the root of trust, intermediate owners of the data processing system, and a new owner of the data processing system. To facilitate the transfer, each of data processing systems 100 may contact a rendezvous system (e.g., rendezvous system 106) by default. The rendezvous system may direct data processing systems 100 to any of orchestrators 102 for management. When so directed, onboarding processes may be performed to enable a corresponding orchestrator to manage the data processing system.

Voucher management system 104 may provide vouchers (e.g., including information usable to validate a root of trust and delegations of authority over a data processing system to another entity) to entities with permissions to onboard and/or manage data processing systems 100. To provide its functionality, voucher management system 104 may generate vouchers dynamically as requested by orchestrator 102. When generated, the vouchers may include, for example, a public key usable to verify signatures generated using a device attestation key of a data processing system (e.g., which may be protected by a trusted platform module of the data processing system), a symmetric or asymmetric encryption key (e.g., which may be protected by a trusted platform module of the data processing system), and/or other types of data structures.

Orchestrators 102 may onboard and use data processing systems to provide desired computer-implemented services. To onboard data processing systems, orchestrator 102 may perform partial or full onboarding processes. During these onboarding processes, a data processing may be configured, may instantiate various software components, may establish accounts for various entities, and/or may perform other actions under the direction of an orchestrator that is verifiable as having authority of the data processing system.

Additionally, to facilitate onboarding, orchestrator 102 may (i) obtain vouchers from voucher management system 104, and (ii) distribute the vouchers and/or information included in the vouchers to rendezvous system 106.

When performing their functionality, data processing systems 100, orchestrators 102, voucher management system 104, and/or rendezvous system 106 may perform all, or a portion, of the methods and/or actions shown in FIGS. 2A-2B and 3A-3B.

Data processing systems 100, orchestrators 102, voucher management system 104, and/or rendezvous system 106 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
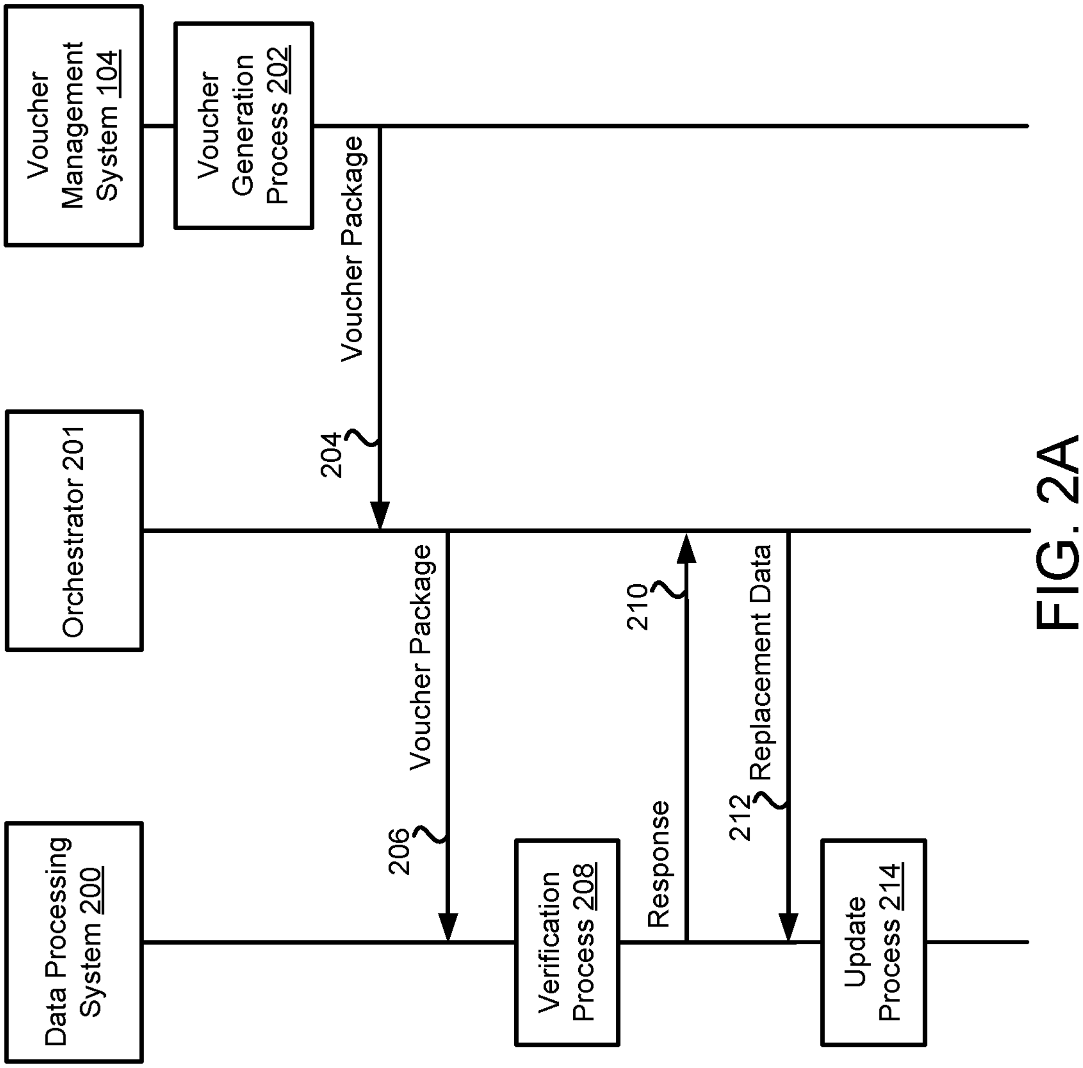
FIGS. 2A-2B show interaction diagrams in accordance with an embodiment.
Figure 2B:
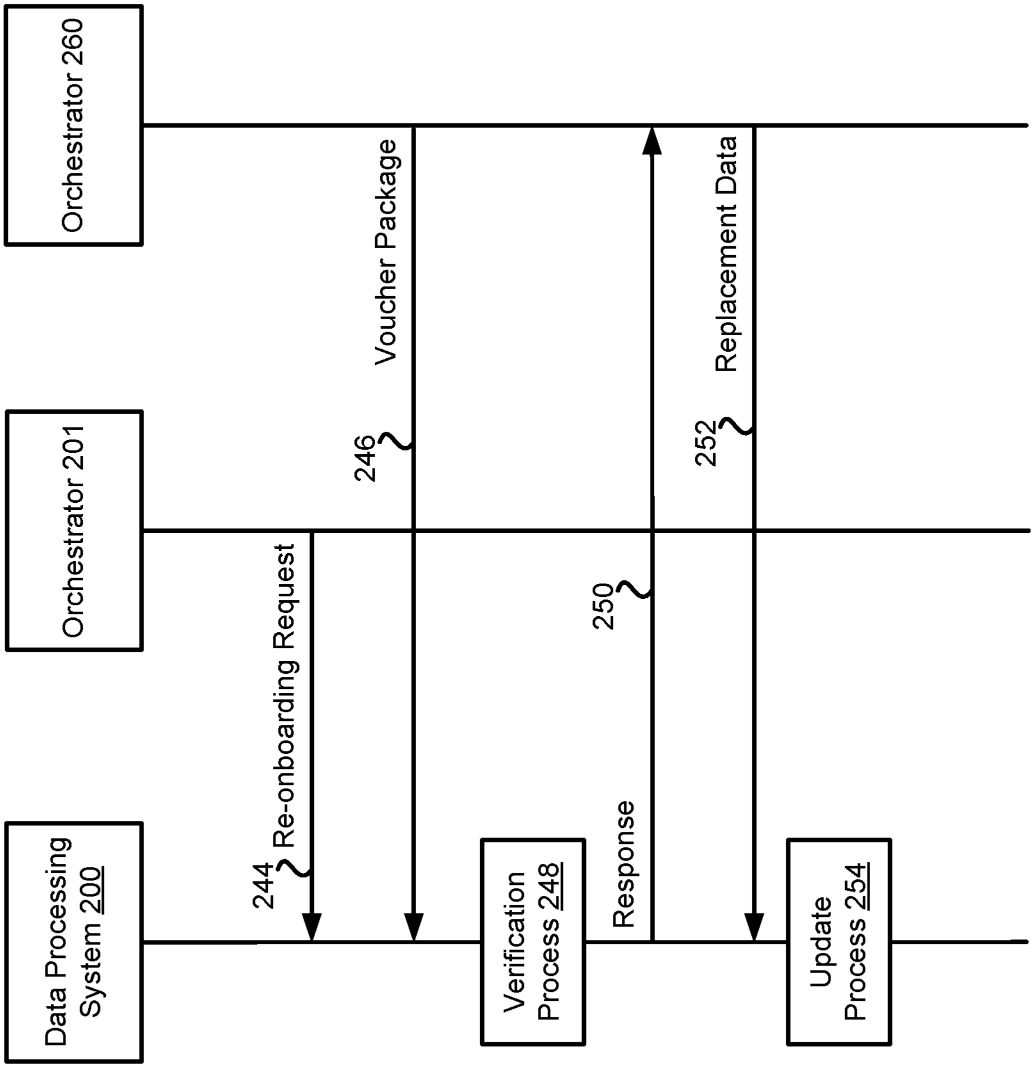

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using named rectangular boxes at the top of each figure. Lines descend from each of these boxes. Boxes superimposed over these lines may indicate processes performed by the corresponding component, and arrows between the descending lines indicate interactions between the components.

Generally, the processes and interactions are temporally ordered in an example order with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. FIG. 2A may illustrate a process for onboarding data processing system 200 in accordance with an embodiment.

Data processing system 200 may be a new data processing system (e.g., similar to data processing systems 100) that is to be onboarded to a system maintained by a first entity. For example, the system may be a data center operated by the first entity. The first entity may have purchased data processing system 200 from a second entity (e.g., a manufacturer, a reseller, etc.).

To enable data processing system 200 to be onboarded, voucher management system 104 may perform voucher generation process 202. During voucher generation process 202, a voucher may be generated that includes a key usable to verify signatures generated using a device attestation key (e.g., a root of trust) for data processing system 200.

At interaction 204, a voucher package may be provided to orchestrator 201. For example, voucher package may be generated and provided to orchestrator 201 in response to a request (not shown) for the voucher from orchestrator 201. The voucher package may include various certificates establishing a chain of delegation of authority over data processing system to orchestrator 201. Additionally, the voucher package may include a certificate delegating authority over orchestrator 201 for the type of onboarding to perform.

At interaction 206, the voucher package may be provided from the orchestrator 201 to data processing system 200.

To enable data processing system 200 to reach orchestrator 201, orchestrator 201 may contact a rendezvous system which data processing system 200 is programmed to contact by default. Orchestrator 201 may instruct the rendezvous system to direct data processing system 200 to orchestrator 201.

Consequently, when data processing system 200 arrives at a site and is powered, data processing system 200 may contact the rendezvous system and then orchestrator 201 in turn. Once contacted, orchestrator 201 may provide the voucher package to data processing system 200 at interaction 206. However, it will be appreciated that the voucher package may be provided to data processing system 200 by, for example, the rendezvous system.

Once the voucher package is obtained, data processing system 200 may perform verification process 208 to verify that orchestrator 201 has been delegated authority over it. The authority may be verified by (i) sequentially verifying that each certificate (or other cryptographically verifiable data structure) can be cryptographically verified, and (ii) establishing a chain of delegations of authority using the verified certificates between a root of trust and orchestrator 201. If the chain can be established, data processing system 200 may determine that orchestrator 201 has authority over it.

Additionally, during verification process, data processing system 200 may ascertain the type (e.g., full or partial) of onboarding process that orchestrator 201 is authorized to initiate.

Based on the outcome of verification process 208, data processing system 200 may send a response to orchestrator 201 at interaction 210. The response may indicate whether data processing system 200 is willing to cooperate with orchestrator 201, may include information usable to establish a secure communication session such as keys usable to establish a session key, and/or other information.

At interaction 212, orchestrator 201 may send replacement data to data processing system 200. Once received, data processing system 200 may perform update process 214. During update process 214, data processing system 200 may update the information that it maintains and uses to verify authority (e.g., referred to as authority resolution data). For example, data processing system 200 may update the information by either (i) replacing original management information that it maintains (e.g., the root of trust, the voucher, etc.), or (ii) treat the replacement data as supplemental data and add it to the original management information.

In either case, once the authority resolution data is updated, data processing system 200 may use the updated authority resolution data to ascertain authority of it. For example, when work orders are obtained, data processing system 200 may use the authority resolution data to check signatures. If the work orders are not signed using keys to which authority has been delegated, then data processing system 200 may refuse to perform the workorders.

Thus, via the method shown in FIG. 2A, access information usable to join a wireless network may be automatically distributed to a not-yet onboarded data processing system. The access information may be used to complete onboarding, as discussed with respect to FIG. 2C, below.

Turning to FIG. 2B, a second interaction diagram in accordance with an embodiment is shown. FIG. 2B may illustrate a process for re-onboarding data processing system 200 to another orchestrator in accordance with an embodiment.

Now, consider an example scenario where an owner of data processing system 200 desires to re-onboard data processing system 200 to a different orchestrator (e.g., 260). If the onboarding of data processing system 200 was a partial onboarding, data processing system 200 may still have access to original management information such as the original root of trust, an original globally unique identifier, original rendezvous system information, etc.

Consequently, to initiate re-onboarding, orchestrator 260 may contact the rendezvous system and provide new information for onboarding data processing system 200 so that the rendezvous server directs data processing system 200 to it rather than orchestrator 201. Once the rendezvous system is updated, orchestrator 201 may send a re-onboarding request to data processing system 200 at interaction 244.

In response to receiving the re-onboarding request, data processing system 200 may revert its management state. To do so, data processing system 200 may discard the replacement data previously obtained.

Once the management state is reverted, data processing system 200 may contact the rendezvous system, which may in turn direct it to orchestrator 260. Data processing system 200 may then contact orchestrator 260 to perform a similar onboarding process to that discussed with respect to interactions 206, 210, 212 and processes 208, 214.

For example, at interaction 246, orchestrator 260 may provide a voucher package to data processing system 200, and data processing system 200 may perform verification process 248. Once verified, data process system 200 may send a response at interaction 250, which may in turn cause orchestrator 260 to provide replacement data at interaction 252. Finally, update process 254 may be performed, which may vary depending on whether orchestrator 260 is authorized to perform full or partial onboarding processes.

Thus, via the method shown in FIG. 2B, a data processing system may be re-onboarded using original management information. Consequently, vouchers generated by voucher management system 104 may be used in process (e.g., rather than requiring that the vouchers be generated by an owner of orchestrator 201, 260.

As discussed above, various cryptographically verifiable data structures may be used to onboard and manage authority over data processing systems.

Figure 2C:
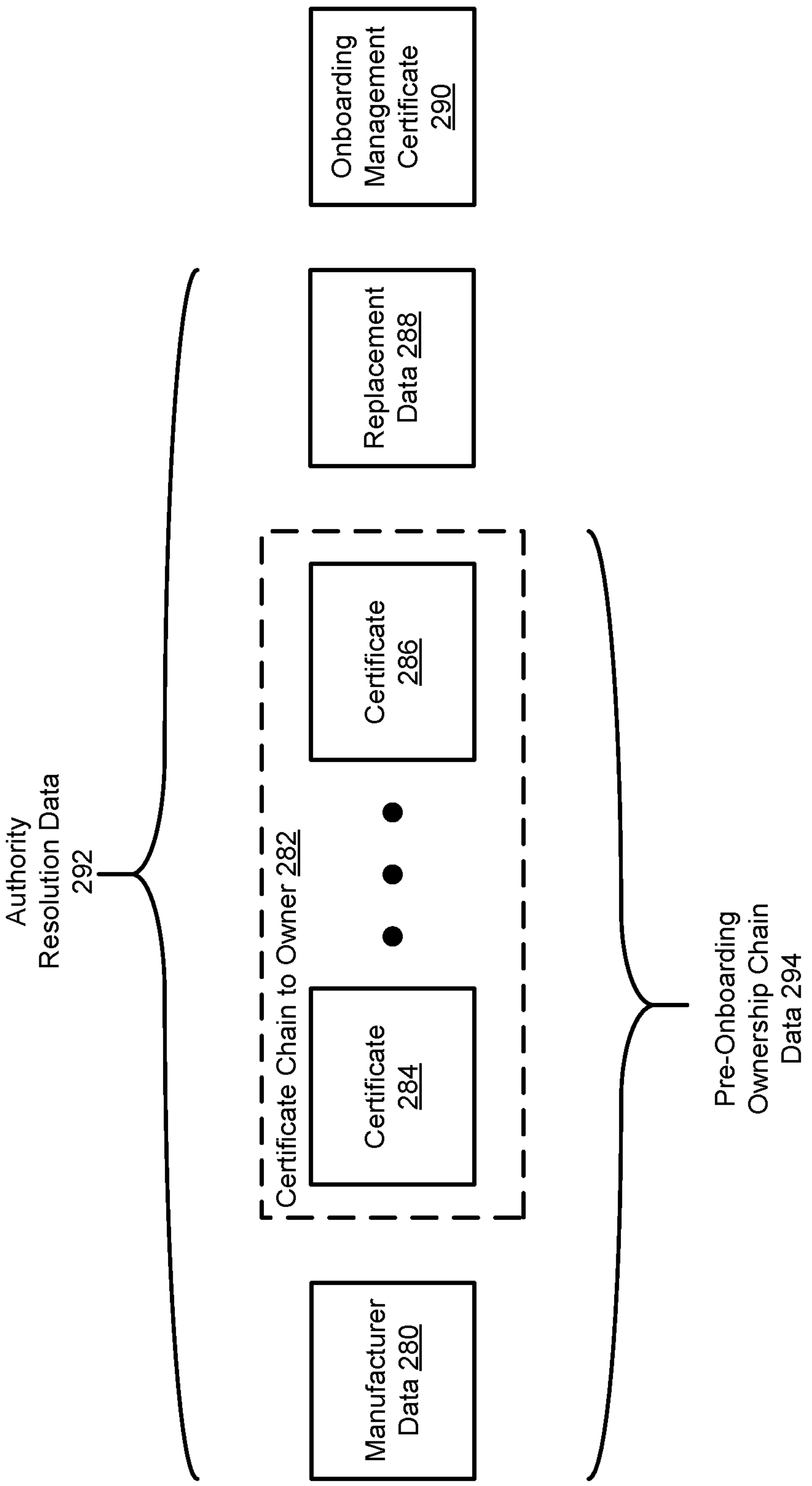
FIG. 2C shows a diagram of data structures in accordance with an embodiment.

Turning to FIG. 2C a diagram illustrating data structures in accordance with an embodiment is shown.

When a data processing system is manufactured, a manufacture may designate manufacturer data 280 for the data processing system. The manufacturer data may include, for example, a public key, a globally unique identifier, a rendezvous system identity, and/or other types of information. All or a portion of the manufacturer data may be sealed in a trusted platform module, or other secret protection component.

The public key may serve as the root of trust for the data processing system. Thus, when manufactured, the public key may be used to identify, for example, trusted work order, data structures, etc. For example, the public key may be used to verify signatures.

As ownership in the data processing system changes, certificates documenting these changes in ownership and corresponding authority may be generated. Each certificate may delegate ownership/authority over the data processing system to another entity by including a public key of the other entity, and may be signed by the private key of the entity (e.g., a previous owner) that previously owned/had authority over the data processing system.

These certificates (e.g., 284-286) may form certificate chain to owner 282. The chain may be cryptographically verifiable and include delegation statements usable to verify that authority over the data processing system has been delegated to an owner. For example, when a data processing system is purchased, a final certificate (e.g., 286) may be added to the certificate chain for this delegation of ownership.

To manage the data processing system, the owner may delegate authority over the data processing system to an orchestrator.

The owner may then generate a certificate (e.g., replacement data 288) that delegates or otherwise grants authority over the data processing system to an orchestrator. The certificate may also specify a different globally unique identifier for the data processing system, a new rendezvous system, and/or include other information usable to facilitate management of the data processing system by the owner.

In the case of a full onboarding process, the manufacturer data may be discarded and replaced with the replacement data. This may result in certificate chain to owner 282 no longer being usable to verify delegation of authority from the manufacturer. Rather, the new owner may serve as the root of trust. However, this replacement of the manufacturer data may also deprive the new owner of using existing rendezvous systems and certificates to re-onboard the data processing system to other orchestrators.

However, in the case of a partial onboarding process, the manufacturer data may be retained. Thus, all of the pre-onboarding ownership chain data 294 (e.g., prior to onboarding) may be retained and may be usable for onboarding purposes. Thus, to re-onboard the data processing system to a new orchestrator, authority resolution data 292 may only need to be rolled back by discarding replacement data 288. Consequently, when the data processing system contacts the rendezvous server a second time, the manufacturer data and the certificate chain may be usable to verify authority over the data processing system. Accordingly, the data processing system may be willing to accept different replacement data that delegates authority over the data processing system to the other orchestrator.

To manage the type of onboarding process that an orchestrator is authorized to perform, an onboarding management certificate (e.g., 290) may be generated (e.g., by an owner of the data processing system) and used by the data processing system to resolve how to use replacement data when it is obtained from an orchestrator.

For example, onboarding management certificate 290 may define the types of onboarding that an orchestrator is allowed to perform. Thus, if the orchestrator attempts to perform full onboarding, but is only authorized to perform a partial onboarding, then the data processing system may treat any replacement data received as supplemental data (e.g., as shown in FIG. 2C).

Onboarding management certificate 290 may be a signed data structure, and may be generated by an owner of an orchestrator to which the data processing system will be onboarded.

Figure 3A:
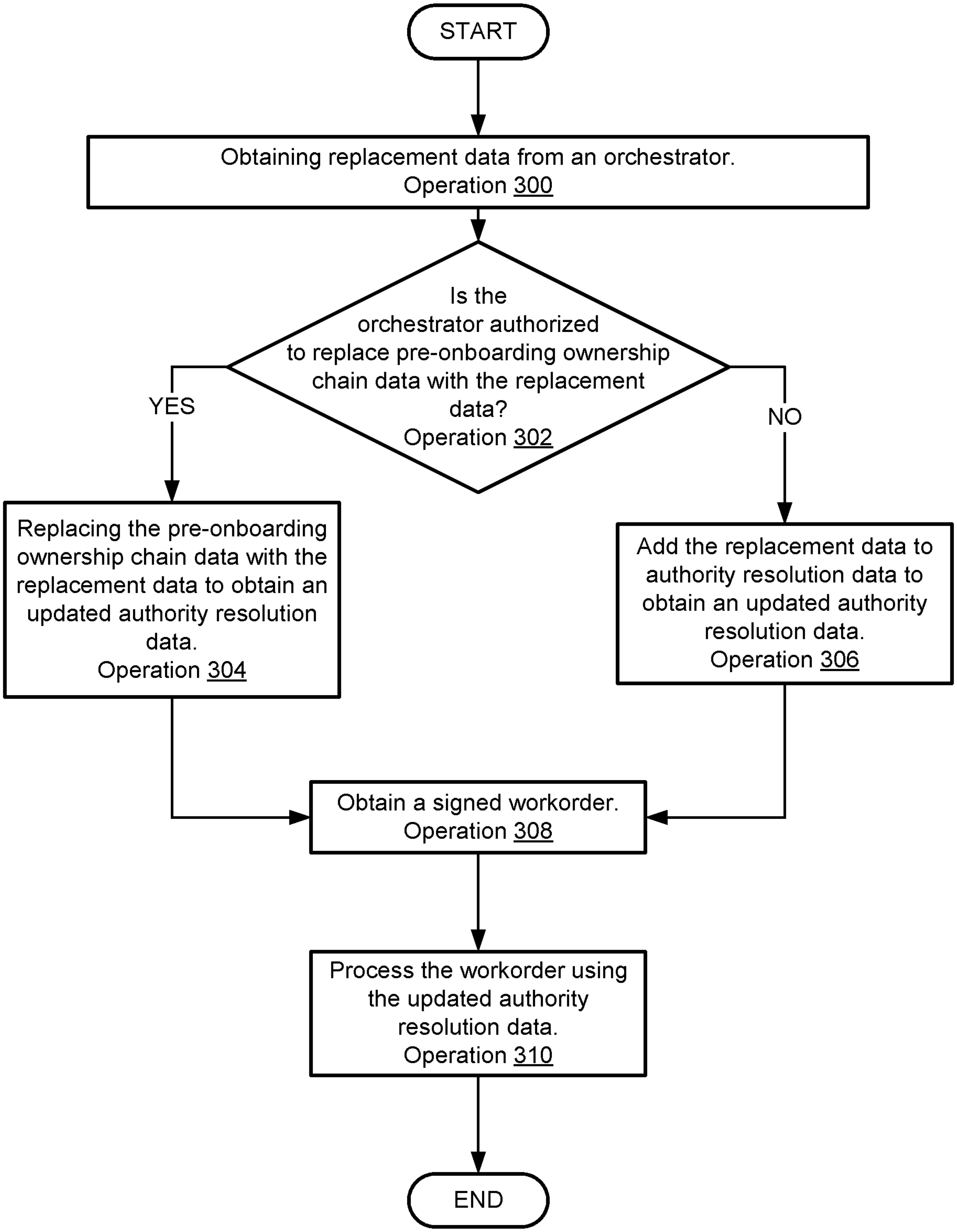
FIGS. 3A-3B show flow diagrams illustrating methods in accordance with an embodiment.
Figure 3B:
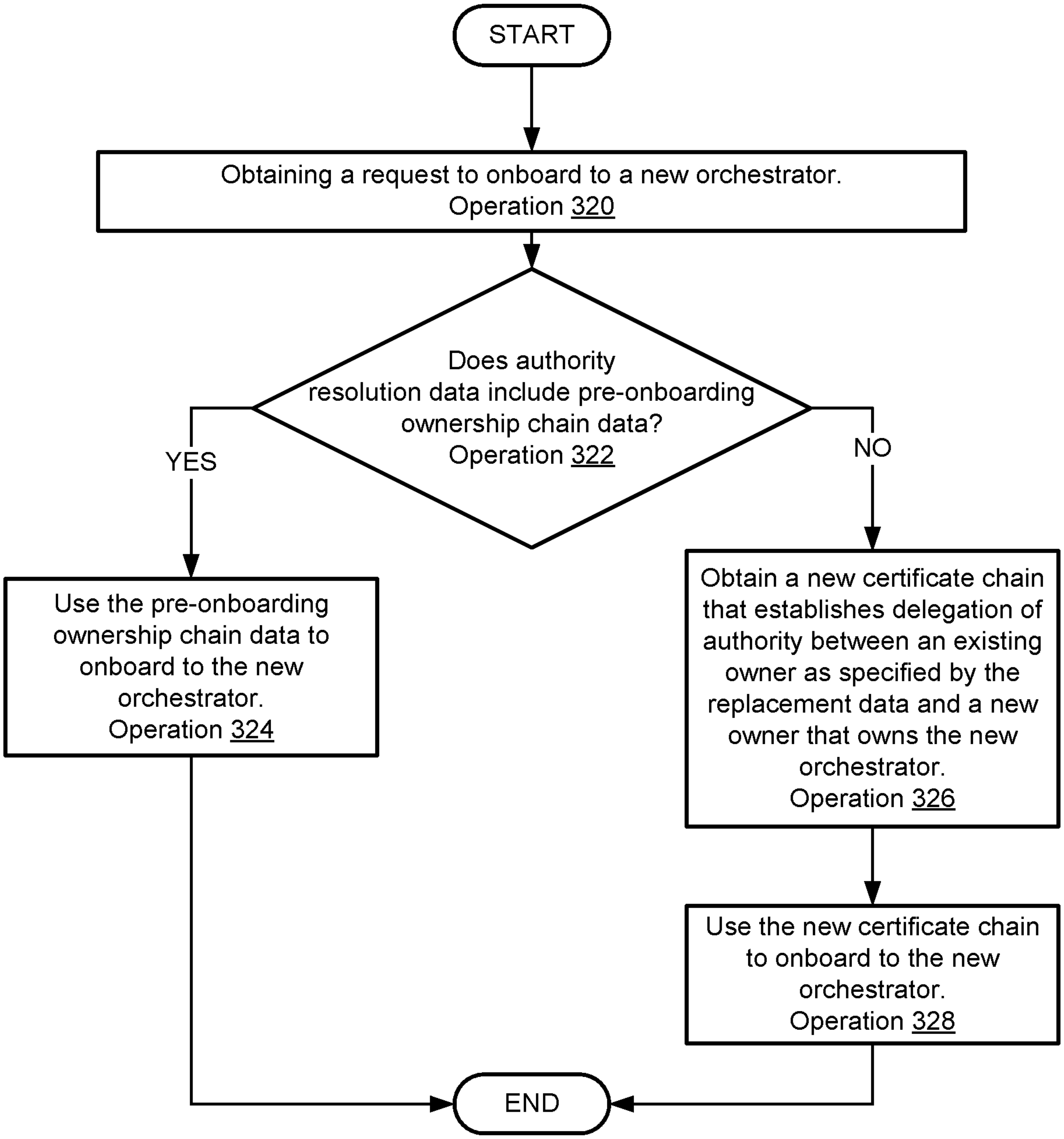

As discussed above, the components of FIG. 1 may perform various methods to manage onboarding of devices. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of onboarding a data processing system to provide computer implemented services in accordance with an embodiment is shown. The method may be performed, for example, by a voucher management service, an orchestrator, a data processing system, a rendezvous system, a communication manager, and/or any other entity of the system of FIG. 1.

Prior to operation 300, a data processing system may be obtained by an entity that operates a management domain that includes an orchestrator. When powered, the data processing system may contact a rendezvous server which may direct the data processing system to the edge orchestrator.

At operation 300, replacement data from the orchestrator may be obtained. The replacement data may be obtained by receiving it from the edge orchestrator as part of onboarding. The replacement data may include a new root of trust (e.g., a public key of a public-private key pair, with the private key being kept by the edge orchestrator), and a new globally unique identifier for the data processing system, an identity of a new rendezvous server, and/or other information. The replacement data may include and/or be accompanied with instructions that indicate that the replacement data is to replace pre-onboarding ownership chain data. For example, the instructions may specify that similar information from the manufacturer in authority resolution data maintained by the data processing system is to be replaced by the replacement data.

At operation 302, a determination is made regarding whether the orchestrator is authorized to replace the pre-onboarding ownership chain data with the replacement data. The determination may be made by reading data from a certificate (e.g., an onboarding management certificate). If such a certificate is present and associated with the orchestrator, then the content of the certificate may indicate whether the orchestrator is authorized to replace the pre-onboarding ownership chain data. For example, the certificate may indicate whether the orchestrator is authorized to perform a full or partial onboarding of the data processing system.

If the orchestrator is authorized, then the method may proceed to operation 304. Otherwise, the method may proceed to operation 306.

At operation 304, the pre-onboarding ownership chain data may be replaced with the replacement data to obtain updated authority resolution data. The pre-onboarding ownership chain data may be replaced by deleting the manufacturer supplied data and replacing it with the replacement data.

At operation 306, the replacement data is added to the authority resolution data to obtain the updated authority resolution data. In other words, the replacement data may be treated as supplemental data, and may be added to the existing authority resolution data which may include the pre-onboarding ownership chain data.

At operation 308, a signed workorder is obtained. The signed workorder may be obtained by receiving it from another device.

At operation 310, the workorder is processed using the updated authority resolution data. The worker may be processed by attempting to verify a signature of the workorder using the updated authority resolution data. The request may also be compared to the authority delegated to the trusted entity (e.g., by parsing the certificate chains of the updated authority resolution data to identify the delegations and corresponding authority of the requestor). If the signature is verified as being from a trusted entity with authority over the data processing system for the requested activity, then the requested activity may be performed. If not verified or the requested activity is beyond the delegated authority, then the requested activity may not be performed.

The method may end following operation 310.

Thus, using the method illustrated in FIG. 3A, embodiments disclosed herein may place data processing systems in better condition for re-onboarding after initially onboarded when partial onboardings are performed (e.g., the NO path following operation 302). For example, the data processing systems may have retained more information usable to verify authority of other entities.

Turning to FIG. 3B, a second flow diagram illustrating a method of re-onboarding a data processing system to provide computer implemented services in accordance with an embodiment is shown. The method may be performed, for example, by a voucher management service, an orchestrator, a data processing system, a rendezvous system, a communication manager, and/or any other entity of the system of FIG. 1.

At operation 320, a request to onboard to a new orchestrator is obtained. The request may be obtained, for example, from an existing orchestrator to which a data processing system had previously onboarded.

At operation 322, a determination is made regarding whether authority resolution data maintained by the data processing system includes pre-onboarding ownership chain data. In other words, whether a full or partial onboarding was previously performed. If a partial onboarding was previously performed, then the authority resolution data may include the pre-onboarding ownership chain data.

If the authority resolution data include the pre-onboarding ownership chain data, then the method may proceed to operation 324. Otherwise, the method may proceed to operation 326.

At operation 324, the pre-onboarding ownership chain data is used to onboard to the new orchestrator. The pre-onboarding ownership chain data may be used to revert the management state of the data processing system to a previous state to enable the data processing system to onboard to the new orchestrator. The pre-onboarding ownership chain data may be used to revert the management state by removing previously added replacement data for the orchestrator from the authority resolution data.

Once removed, the data processing system may contact a rendezvous server (e.g., as specified by the manufacturer information), which may direct it to the new orchestrator. The new orchestrator may then verify itself to the data processing system, and allow it to provide replacement data to it to establish a chain of delegation of authority from the root of trust to the new orchestrator.

The method may end following operation 324.

Returning to operation 322, the method may proceed to operation 326 following operation 322 if the authority resolution data does not include the pre-onboarding ownership chain data.

At operation 326, a new certificate chain that establishes delegation of authority between an existing owner of the data processing system as specified by the replacement data and a new owners that owns the new orchestrator is obtained. The new certificate chain may be obtained by obtaining one or more certificates from a certificate management system, or other system, that is maintained by the existing owner.

At operation 328, the new certificate chain is used to onboard the data processing system to the new orchestrator. The new certificate chain may be used by (i) directing the data processing system to a rendezvous system maintained by the existing owner which may direct the data processing system to the new orchestrator, and (ii) allowing the new orchestrator to establish authority over the new data processing system using the new certificate chain.

The method may end following operation 328.

Thus, using the method illustrated shown in FIG. 3B, a data processing system may be onboarded to a new orchestrator. However, if the data processing system was onboarded previously through partial onboarding, the difficulty of re-onboarding the data processing system to the new orchestrator may be reduced. For example, previously used rendezvous servers, manufacturer information, and certificate chains (e.g., during onboarding to the orchestrator) may be reused. However, should a full onboarding be performed, different rendezvous servers and certificate chains may need to be used by virtue of the manufacturer information having been previously replaced with replacement data. The replacement data may make existing certificate chains unusable since they no longer establish valid delegations of authority due to the new root of trust.

Thus, embodiments disclosed herein may address, among others, the technical problem of management of data processing systems in distributed systems. The embodiments disclosed here may address this challenge by performing partial onboardings rather than full onboardings to management domains. By performing partial onboardings, the data processing system may be re-onboarded to new domains without needing to establish new cryptographically verifiable chains of authority delegation, for management purposes.

Figure 4:
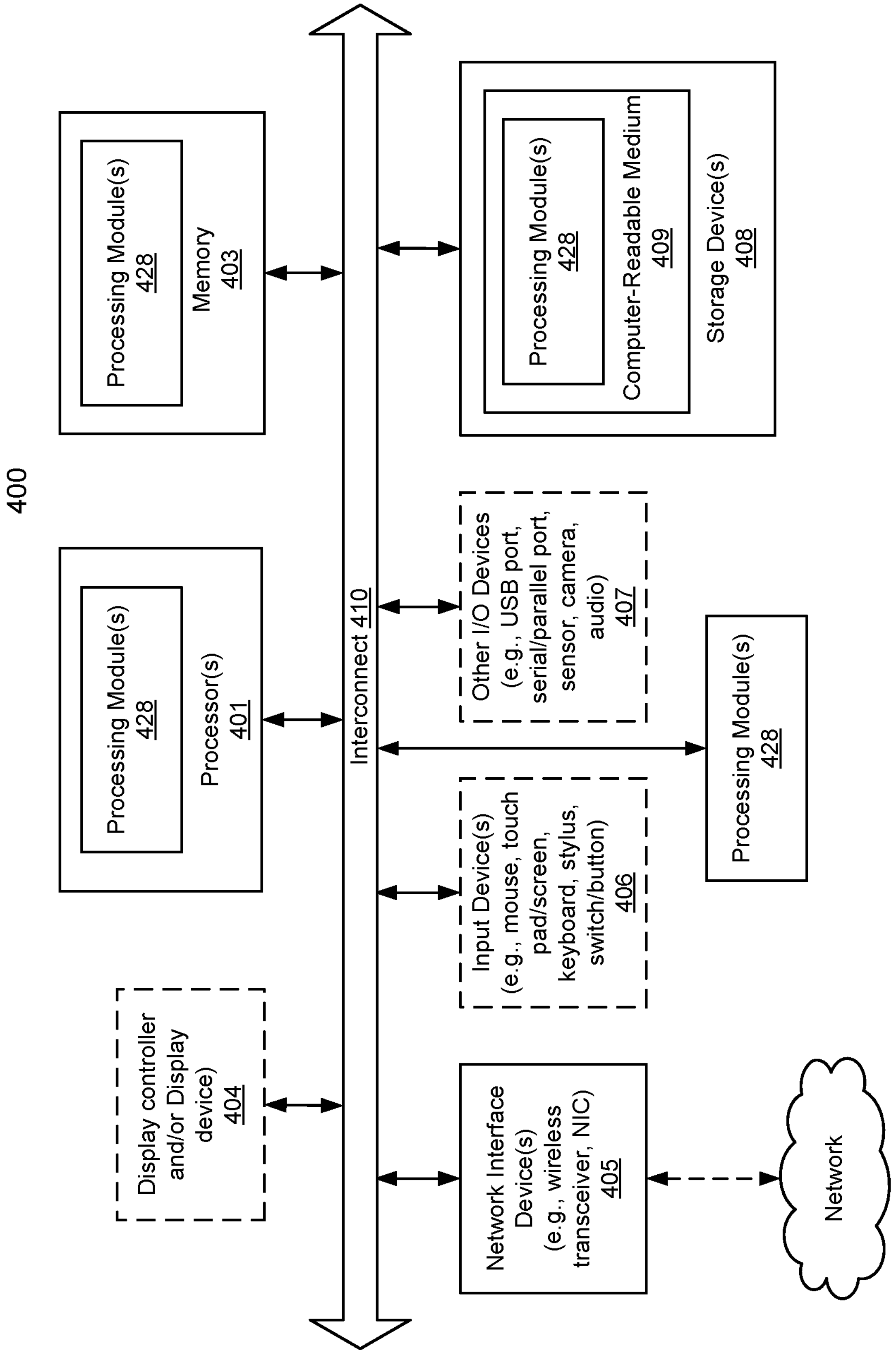
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing onboarding of a data processing system, the method comprising:
 establishing, by an orchestrator and to a rendezvous system, authority over the data processing system using pre-onboarding ownership chain data;
 redirecting, by the rendezvous system, the data processing system to the orchestrator;
 obtaining, from the orchestrator, a voucher package comprising:
  a pre-onboarding ownership chain data; and
  separate from the pre-onboarding ownership chain data, an onboarding management certificate that indicates whether the orchestrator is authorized to replace the pre-onboarding ownership chain data with replacement data during the onboarding of the data processing system;
 verifying, by the data processing system, that the orchestrator has authority over the data processing system based on the pre-onboarding ownership chain data of the voucher package;
 making, by the data processing system, a first determination regarding whether the orchestrator is authorized to replace the pre-onboarding ownership chain data with the replacement data based on the onboarding management certificate of the voucher package;
 in response to the verifying and the first determination, sending, by the data processing system and to the orchestrator, a response indicating a first instance or a second instance of the first determination;
 obtaining the replacement data from the orchestrator;
 in the first instance of the first determination where the orchestrator is authorized:
  discarding the pre-onboarding ownership chain data in authority resolution data and adding the replacement data to the authority resolution data to obtain first updated authority resolution data to complete the onboarding of the data processing system;
  obtaining a first signed workorder; and
  processing the first signed workorder using the first updated authority resolution data; and
 in the second instance of the first determination where the orchestrator is not authorized:
  adding the replacement data to the authority resolution data as supplemental data to obtain second updated authority resolution data to complete the onboarding of the data processing system;
  obtaining a second signed workorder; and
  processing the second signed workorder using the second updated authority resolution data.

2. The method of claim 1, further comprising:
 in the first instance of the first determination where the orchestrator is authorized:
  obtaining a request to onboard to a new orchestrator:
  making a second determination that the first updated authority resolution data does not comprise the pre-onboarding ownership chain data;
  based on the second determination:
   obtaining a new certificate chain that establishes delegation of authority between an existing owner as specified by the replacement data and a new owner that owns the new orchestrator; and
   using the new certificate chain to onboard to the new orchestrator.

3. The method of claim 1, further comprising:
 in the second instance of the first determination where the orchestrator not authorized:
  obtaining a request to onboard to a new orchestrator:
  making a second determination that the first updated authority resolution data comprises the pre-onboarding ownership chain data; and
  based on the second determination:
   using the pre-onboarding ownership chain data to perform a second onboard of the data processing system to the new orchestrator.

4. The method of claim 3, wherein using the pre-onboarding ownership chain data to perform the second onboard to the new orchestrator comprises:
 contacting the rendezvous system to obtain a redirection to the new orchestrator; and
 verifying that the new orchestrator has authority over the data processing system using, at least in part, the pre-onboarding ownership chain data.

5. The method of claim 1, wherein
 in response to the response indicating the first instance of the first determination, the orchestrator is adapted to provide the replacement data with first instructions to replace any pre-onboarding ownership chain data trusted by the data processing system with the replacement data, and
 in response to the response indicating the second instance of the first determination, the orchestrator is adapted to provide the replacement data with second instructions to add the replacement data to any pre-onboarding ownership chain data trusted by the data processing system as the supplemental data.

6. The method of claim 1, wherein the replacement data comprises a new root of trust and a new globally unique identifier for the data processing system.

7. The method of claim 6, wherein the pre-onboarding ownership chain data comprises an original root of trust and an original globally unique identifier for the data processing system, and a certificate chain usable to verify that authority over the data processing system has been delegated from the original root of trust to an owner of the orchestrator.

8. The method of claim 7, wherein the replacement data is signed with a key of the owner of the orchestrator.

9. A non-transitory machine-readable medium having instructions stored therein, which when executed by a processor, cause operations for managing onboarding of managing onboarding of a data processing system, the operations comprising:
 establishing, by an orchestrator and to a rendezvous system, authority over the data processing system using pre-onboarding ownership chain data;
 redirecting, by the rendezvous system, the data processing system to the orchestrator;
 obtaining, from the orchestrator, a voucher package comprising:
  a pre-onboarding ownership chain data; and separate from the pre-onboarding ownership chain data, an onboarding management certificate that indicates whether the orchestrator is authorized to replace the pre-onboarding ownership chain data with replacement data during the onboarding of the data processing system;

verifying, by the data processing system, that the orchestrator has authority over the data processing system based on the pre-onboarding ownership chain data of the voucher package;

making, by the data processing system, a first determination regarding whether the orchestrator is authorized to replace the pre-onboarding ownership chain data with the replacement data based on the onboarding management certificate of the voucher package;

in response to the verifying and the first determination, sending, by the data processing system and to the orchestrator, a response indicating a first instance or a second instance of the first determination;

obtaining the replacement data from the orchestrator;

in the first instance of the first determination where the orchestrator is authorized:

discarding the pre-onboarding ownership chain data in authority resolution data and adding the replacement data to the authority resolution data to obtain first updated authority resolution data to complete the onboarding of the data processing system;

obtaining a first signed workorder; and processing the first signed workorder using the first updated authority resolution data; and in the second instance of the first determination where the orchestrator is not authorized:

adding the replacement data to the authority resolution data as supplemental data to obtain second updated authority resolution data to complete the onboarding of the data processing system;

obtaining a second signed workorder; and processing the second signed workorder using the second updated authority resolution data.

10. The non-transitory machine-readable medium of claim 9, wherein the operations further comprise:

in the first instance of the first determination where the orchestrator is authorized:

obtaining a request to onboard to a new orchestrator:

making a second determination that the first updated authority resolution data does not comprise the pre-onboarding ownership chain data;

based on the second determination:

obtaining a new certificate chain that establishes delegation of authority between an existing owner as specified by the replacement data and a new owner that owns the new orchestrator; and using the new certificate chain to onboard to the new orchestrator.

11. The non-transitory machine-readable medium of claim 9, wherein the operations further comprise:

in the second instance of the first determination where the orchestrator not authorized:

obtaining a request to onboard to a new orchestrator:

making a second determination that the first updated authority resolution data comprises the pre-onboarding ownership chain data; and based on the second determination:

using the pre-onboarding ownership chain data to perform a second onboard of the data processing system to the new orchestrator.

12. The non-transitory machine-readable medium of claim 11, wherein using the pre-onboarding ownership chain data to perform the second onboard to the new orchestrator comprises:

contacting the rendezvous system to obtain a redirection to the new orchestrator; and verifying that the new orchestrator has authority over the data processing system using, at least in part, the pre-onboarding ownership chain data.

13. A management system, comprising:

a processor; and a memory coupled to the processor to store instructions which when executed by the processor cause operations for managing onboarding of a data processing system to be performed, the operations comprising:

establishing, by an orchestrator and to a rendezvous system, authority over the data processing system using pre-onboarding ownership chain data;

redirecting, by the rendezvous system, the data processing system to the orchestrator;

obtaining, from the orchestrator, a voucher package comprising:

a pre-onboarding ownership chain data; and separate from the pre-onboarding ownership chain data, an onboarding management certificate that indicates whether the orchestrator is authorized to replace the pre-onboarding ownership chain data with replacement data during the onboarding of the data processing system;

verifying, by the data processing system, that the orchestrator has authority over the data processing system based on the pre-onboarding ownership chain data of the voucher package;

making, by the data processing system, a first determination regarding whether the orchestrator is authorized to replace the pre-onboarding ownership chain data with the replacement data based on the onboarding management certificate of the voucher package;

in response to the verifying and the first determination, sending, by the data processing system and to the orchestrator, a response indicating a first instance or a second instance of the first determination;

obtaining the replacement data from the orchestrator;

in the first instance of the first determination where the orchestrator is authorized:

discarding the pre-onboarding ownership chain data in authority resolution data and adding the replacement data to the authority resolution data to obtain first updated authority resolution data to complete the onboarding of the data processing system;

obtaining a first signed workorder; and processing the first signed workorder using the first updated authority resolution data; and in the second instance of the first determination where the orchestrator is not authorized:

adding the replacement data to the authority resolution data as supplemental data to obtain second updated authority resolution data to complete the onboarding of the data processing system;

obtaining a second signed workorder; and processing the second signed workorder using the second updated authority resolution data.

14. The management system of claim 13, wherein the operations further comprise:

in the first instance of the first determination where the orchestrator is authorized:

obtaining a request to onboard to a new orchestrator:

making a second determination that the first updated authority resolution data does not comprise the pre-onboarding ownership chain data;

based on the second determination:

obtaining a new certificate chain that establishes delegation of authority between an existing owner as specified by the replacement data and a new owner that owns the new orchestrator; and using the new certificate chain to onboard to the new orchestrator.

15. The management system of claim 13, wherein the operations further comprise:

in the second instance of the first determination where the orchestrator not authorized:

obtaining a request to onboard to a new orchestrator:

making a second determination that the first updated authority resolution data comprises the pre-onboarding ownership chain data; and based on the second determination:

using the pre-onboarding ownership chain data to perform a second onboard of the data processing system to the new orchestrator.

16. The management system of claim 15, wherein using the pre-onboarding ownership chain data to perform the second onboard to the new orchestrator comprises:

contacting the rendezvous system to obtain a redirection to the new orchestrator; and verifying that the new orchestrator has authority over the data processing system using, at least in part, the pre-onboarding ownership chain data.

17. The management system of claim 13, wherein in response to the response indicating the first instance of the first determination, the orchestrator is adapted to provide the replacement data with first instructions to replace any pre-onboarding ownership chain data trusted by the data processing system with the replacement data, and in response to the response indicating the second instance of the first determination, the orchestrator is adapted to provide the replacement data with second instructions to add the replacement data to any pre-onboarding ownership chain data trusted by the data processing system as the supplemental data.

18. The management system of claim 13, wherein the replacement data comprises a new root of trust and a new globally unique identifier for the data processing system.

19. The management system of claim 18, wherein the pre-onboarding ownership chain data comprises an original root of trust and an original globally unique identifier for the data processing system, and a certificate chain usable to verify that authority over the data processing system has been delegated from the original root of trust to an owner of the orchestrator.

20. The management system of claim 19, wherein the replacement data is signed with a key of the owner of the orchestrator.

* * * * *